United States Patent [19]

Prochnow

[11] 4,093,363
[45] June 6, 1978

[54] MOTION PICTURE PROJECTOR

[75] Inventor: Claus Prochnow, Brunswick, Germany

[73] Assignee: Rollei-Werke Franke & Heidecke, Brunswick, Germany

[21] Appl. No.: 728,210

[22] Filed: Sep. 30, 1976

[51] Int. Cl.² ............................................. G03B 21/10
[52] U.S. Cl. .................................. 352/104; 352/129; 353/18; 353/71
[58] Field of Search ...................... 352/104, 129, 242; 353/71, 18, 67, 74

[56] References Cited

U.S. PATENT DOCUMENTS

| 2,032,116 | 2/1936 | Conrad | 352/104 |
| 2,906,167 | 9/1959 | Castedello | 352/104 |
| 3,391,979 | 7/1968 | Lessler | 352/104 |
| 3,870,411 | 3/1975 | Schwartz | 352/104 |
| 3,904,283 | 9/1975 | Arai | 352/104 |

Primary Examiner—Monroe H. Hayes
Attorney, Agent, or Firm—Stonebraker, Shepard & Stephens

[57] ABSTRACT

A motion picture projector having a housing or casing having one narrow side and one wide side, substantially perpendicular to each other. The film spools are arranged on the wide side. In a first projection position, the housing is arranged upright, resting on its narrow side, with the wide side approximately vertical. To enable projection to take place also when the projector is laid on a wide side, rather than standing upright, a first mirror is swung into position across the beam of projected light rays, and projects the rays upwardly to a second mirror arranged at an opening in the wide side of the housing. A control knob moves both mirrors simultaneously to effective projecting position, and also serves to adjust the exact inclination of the second mirror so as to vary the height of the projected image on the viewing screen at some distance from the projector.

8 Claims, 6 Drawing Figures

MOTION PICTURE PROJECTOR

BACKGROUND OF THE INVENTION

The invention relates to a motion picture projector, and particularly but not exclusively to a projector of the size and construction intended for projecting what is called super-8 motion picture film.

Such projectors usually have an upright housing or casing, whose base area is substantially smaller than the side area. The film spools and the operating elements (knobs, switches, etc.) are usually arranged on the side area of the projector, the film spools standing upright, rotating in a vertical plane when the projector is in normal projecting position. Frequently one of the spools is placed on an arm which projects from the housing, and which can be folded relative to the housing for the purpose of transportation and storage.

It has become known in the art to provide projectors in what may be called the horizontal design, where the height of the projector is substantially less than the base area, when positioned for projection. In such projectors, the film spools and the operating elements are again arranged on the side of large area, such a side now being horizontal rather than vertical so that the film spools rotate in a horizontal plane. A deflection system, comprising two mirrors, is used so that the beam of projected light emerges from the housing through an aperture in the upper side, and then it is deflected by one of these mirrors so as to fall on an approximately vertical viewing screen or wall surface, in proper upright orientation.

An object of the present invention is to provide a projector which can be used in both of these modes or positions, for selectively projecting pictures either when the projector is stood upright on its narrow base, or when it is laid down in a flat position, with one of its sides of larger area lying on a table or other suitable support, and with the small dimension of the projector housing extending vertically. With such a projector according to the present invention, the versatility of projection position makes the projector more readily usable in cramped quaters, since it may be placed in either the upright position having a small base area but greater height, or in the low profile position having a considerably large base area but lesser height. Moreover, there is no necessity for assembling or disassembling any bracket or other mechanism for holding a film spool. The convenience of operation in either projection position, enhances the attractiveness of the projector and reduces the reluctance of the owner to use the projector more frequently because of the real or fancied bother of taking the projector from storage position and setting it up for a projection event.

This object of providing a versatile projector capable of projecting pictures in proper orientation on the screen, with the projector in its upright position or in its low position, is admirably fulfilled by the construction described in detail below.

DESCRIPTION OF THE PREFERRED EMBODIMENT

Figure 1:
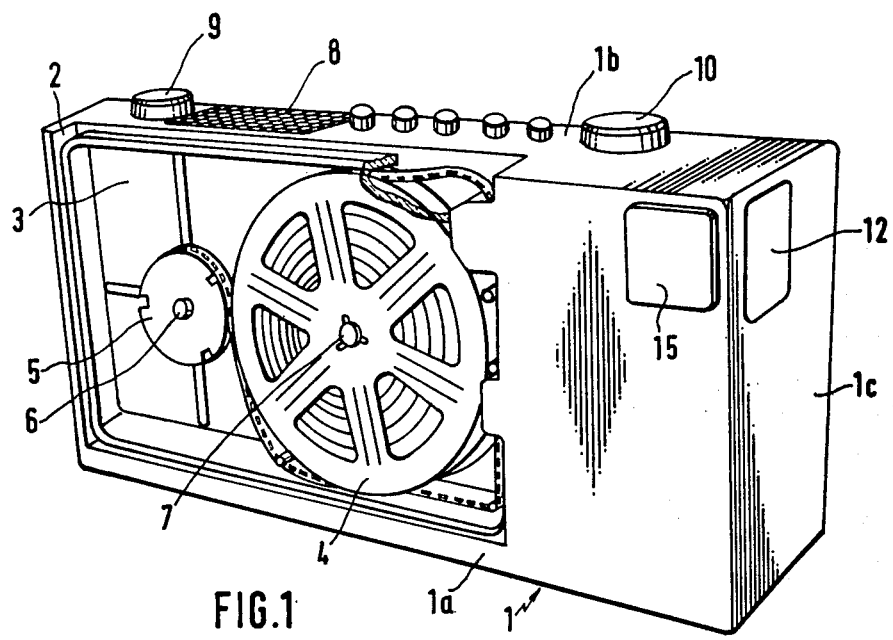
FIG. 1 is a perspective view of a projector according to a preferred embodiment of the invention, ready for operation in its upright position, resting on a comparatively narrow wall of the housing.

According to a preferred embodiment of the invention, the projector to which the present invention is applied is a sound film projector for projecting motion picture film of the Super-8 size. However, the same principles of the invention may be applied to projectors for projecting other sizes of film, with or without sound.

The housing or casing of the projector is in the general shape of a rectangular parallelepiped indicated in general at 1, having relatively wide sides 1a, narrow sides 1b, and ends 1c. On one of the wide or broad sides 1a is a recess 2 for receiving a film cassette 3, which may be loaded with a normal or conventional film spool 4, the film being wound onto a take-up spool or hub 5 during the projection process. The cassette is inserted into the recess 2 in such a way that the winding mandrels or shafts 6 and 7 which project from the bottom surface of the recess will engage in the conventional manner in the central openings of the film spool 4 and take-up reel 5.

Except for the mirror system and its associated parts and control mechanism as described below, the rest of the projector may be of conventional construction, well known in the art, and not illustrated here. It includes, for example, a loudspeaker indicated at 8, a sound volume control knob 9, and other appropriate knobs or buttons preferably all located on the narrow side 1b of the housing. Also on this side there is a control knob 10 for controlling the mirror system, as further described below.

Figure 2:
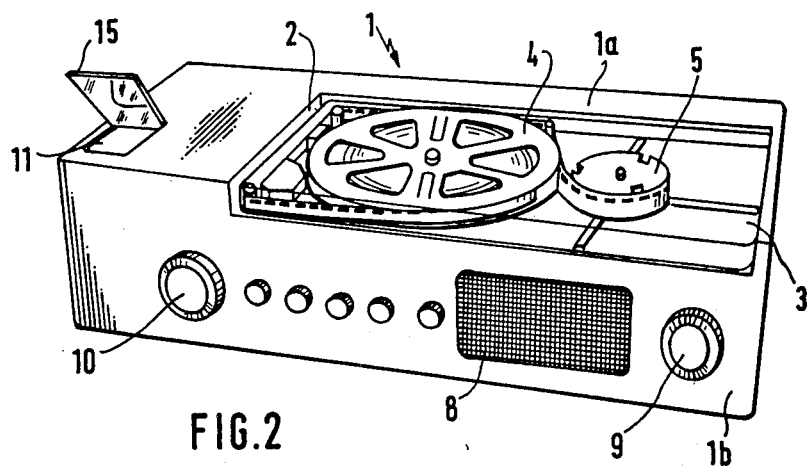
FIG. 2 is a perspective view of the same projector ready for projection in a horizontal or low profile position, resting on a large area wall of the housing.
Figure 4:
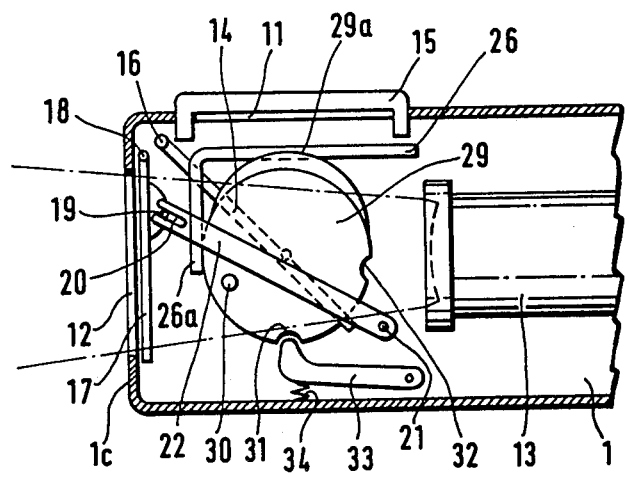
FIG. 4 is a schematic representation partly in elevation and partly in vertical section, illustrating the mirrors and the mechanism for controlling them.

According to the invention, there is a light passage aperture 11 in the broad or wide side 1a, near one end thereof, as seen in FIG. 2, and another light passage aperture 12 in the end wall 1c as illustrated in FIG. 1, both apertures being seen in FIG. 4.

Figure 3:
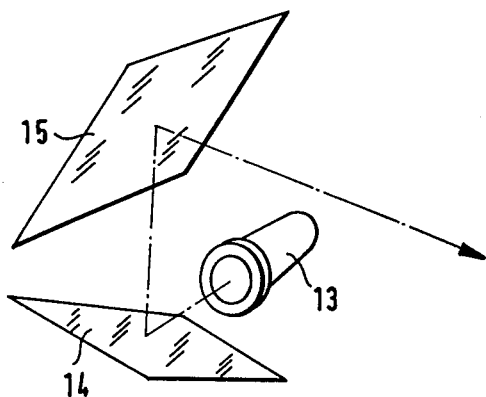
FIG. 3 is a diagram showing schematically the projection lens and the two mirrors which deflect the projection beam when the projector is projecting in the horizontal or low position.

The conventional projection lens of the projector, schematically shown at 13 in FIGS. 3 and 4, projects the beam of light in a direction toward the aperture 12 in the end wall 1c. Whenever this beam is not obstructed, the light will pass through the aperture 12, onto the viewing screen or viewing wall where the image is to be observed. However, in order to view the image right side up, the projector must at this time be resting in the upright or on-edge position illustrated in FIG. 1, with the film reel 4 rotating in a vertical plane. If the projector is laid on its side (that is, on its broad or wide surface opposite to the surface 1a shown in FIG.

1) the projected picture on the screen would be turned or oriented 90° from the proper viewing position.

In order to have the projected picture properly oriented for viewing, when the projector is laid on its side (that is, on a broad or wide surface) in the low profile position illustrated in FIG. 2, a deflecting mirror system is used. This system is illustrated schematically in FIG. 3. The light issuing from the projection lens 13 strikes a first mirror 14, placed at substantially 45° to the optical axis of the projection lens 13, and the beam of light is deflected thereby upwardly to a second mirror 15 which is arranged at approximately 45° and which directs the beam of light to the viewing screen with the picture in proper upright orientation. The mirrors are so arranged that after reflection by the second mirror 15, the central ray of the reflected beam will be projected in a direction substantially perpendicular to the narrow side 1b of the projector housing.

The first mirror 14 is mounted to swing on a pivot or shaft 16 (FIG. 4). When the mirror is in its effective position at 45° to the axis of the projection lens 13, as illustrated in FIG. 4, all of the light beam issuing from the projection lens is deflected by the mirror, and no light passes out through the light aperture 12, which is then closed by a closure flap 17 mounted to swing on a pivot or shaft 18. A pin 19 on the flap 17 engages a slot 20 in the operative lever 22 which is pivoted at 21, and which is swung in the manner indicated below.

Figure 5:
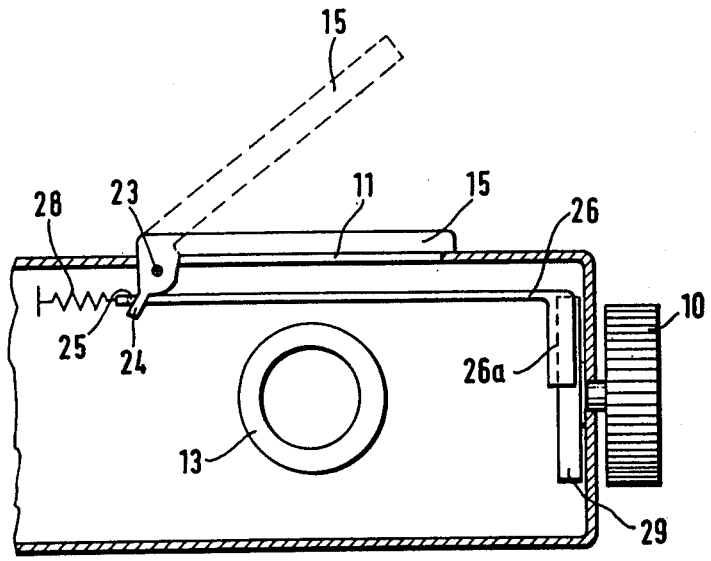
FIG. 5 is another schematic view partly in elevation and partly in vertical section, illustrating part of the mirror control mechanism, this view being taken in a direction at right angles to the direction of viewing in FIG. 4.
Figure 6:
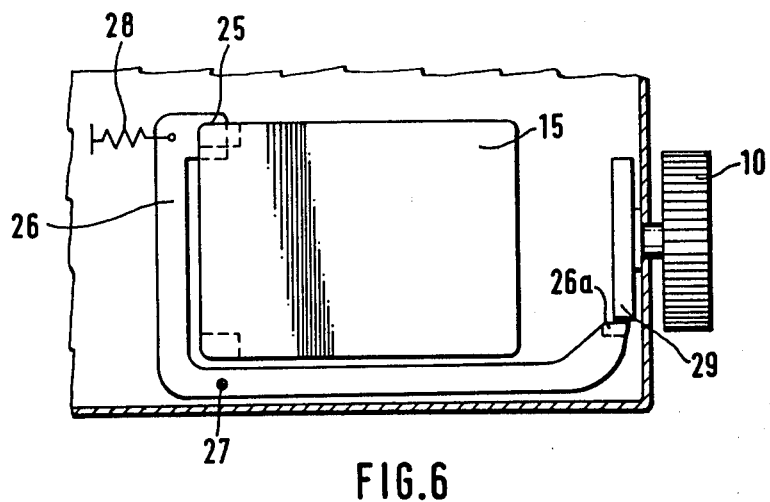
FIG. 6 is a top plan view of the parts shown in FIG. 5, with parts broken away and parts in horizontal section.

The second mirror 15 is mounted to swing on a pivot or shaft 23 located substantially at one edge of the light aperture 11. An extension or arm 24 on the mirror 15 or its frame or carrier, engages in a recess 25 (FIGS. 5 and 6) of a somewhat U-shaped lever 26 pivoted at 27 (FIG. 6) and urged in a counterclockwise direction by a spring 28. The recess 25 is in a short arm of the lever 26. The longer arm thereof, on the other side of the pivot 27, terminates in an end portion 26a riding on a portion of the periphery of a cam disk 29 attached to and rotatable by the operating knob 10 accessible on the outside of the housing.

This cam disk 29 has a laterally extending pin or projection 30 lying in the plane of and adapted to operate the lever 22. One portion of the periphery of the disk has shallow notches 31 and 32 adapted to receive the nose of a latching lever 33 urged toward the disk by a spring 34. Another part of the periphery of the cam disk 29 has a cam portion 29a for engaging with and moving the arm 26a of the lever 26.

The operation is as follows: When it is intended to operate the projector in the upright or high profile position illustrated in FIG. 1, with a narrow side of the projector resting on a supporting surface, the knob 10 is turned to the right or clockwise from the position shown in FIG. 4, until the notch 32 comes opposite the nose of the latching lever 33 and the nose enters this notch 32 to latch the disk 29 frictionally in this position. During this clockwise turning movement, the pin 30 on the disk 29 comes up against the lower side of the pivoted lever 22, and raises this lever clockwise on its pivot 21. The slot 20 of this lever, cooperating with the pin 19 on the closure flap 17, raises the closure flap in a counterclockwise direction on its pivot 18. As the flap swings, it comes against the underside of the mirror 14 and swings the mirror up in a counterclockwise direction on its pivot 16, until both the flap and the mirror are in a position above the cone of rays from the projection lens 13. The light from the projection lens then issues straight out through the light aperture 12, without being interrupted or deflected. At this time, the mirror 15 (or a suitable holder or carrier on which the mirror is mounted) is folded down against the wall of the projector housing, forming a closure for the light aperture 11.

Now if it is desired to project pictures in the low profile position of the projector, that is, with a wide or broad side of the projector resting on the supporting surface as illustrated in FIG. 2, the control knob is turned counterclockwise, forcing the nose of the latching pawl 33 out of the notch 32. As the counterclockwise motion continues, the pin 30 releases the pivoted lever 22, and light restoring springs (not shown) associated with the mirror 14 and flap 17 swing the mirror and flap back to the positions shown in FIG. 4, where the flap closes the light aperture 12, and the mirror lies at 45° to the optical axis of the projection lens 13. At this time, the nose of the latching pawl 33 enters the notch 31, to act as a detent at this point. The mirror 15 has not yet begun to move, and still acts as a closure for the light aperture 11. This position of the parts may be regarded as the normal storage position, both light apertures 11 and 12 being closed to prevent accidental entry of dust into the interior of the projector housing.

The control knob 10 is then turned further to the left or counterclockwise. This brings the cam rise portion 29a into engagement with the end 26a of the lever 26, and swings this lever so as to act on the extension or tail 24 of the mirror 15, swinging this mirror from the closed position illustrated in full lines in FIGS. 4 and 5, to the open position illustrated in dotted lines in FIG. 5 and in full lines in FIG. 2. The control cam 29a is of such shape that during the initial part of the movement of the cam 29 (counterclockwise from the normal closed or storage position) the lever 26 will be moved rapidly at first, to tilt the mirror 15 rapidly to an angle of about 40°, and then to tilt the mirror more slowly from an angle of about 40° to about 50°. Thus the knob 10 provides a fine adjustment of the exact tilt angle of the mirror, enabling the projected light beam to be projected slightly upwardly or downwardly in order to locate the picture at the desired elevation on the viewing screen, without requiring the entire projector housing to be tilted slightly for this purpose.

Thus it is but the work of a moment, by a simple rotation of the knob 10, to adapt the projector for projecting pictures from an upright position resting on a narrow side of the projector housing, or from a low position resting on a wide side of the projector housing, and also but the work of a moment to turn the control knob 10 to the intermediate position in which both of the light apertures in the housing are closed in a protective manner to prevent entrance of foreign substances into the projector mechanism.

It may be noted that when projecting pictures with the projector in the upright or high profile position (FIG. 1) the direction of projection is along the optical axis of the projection lens, and along or parallel to what may be considered the longitudinal axis of the housing or casing of the projector. When projecting pictures while the projector is in the flat or low profile mode or position, (FIG. 2) the direction of projection is substantially at a right angle or perpendicular to the optical axis of the projector lens and to the longitudinal axis of the projector housing or casing. In both positions or modes of the projector, the various control knobs or switches on a narrow wall or surface of the housing are conveniently accessible within easy reach of the operator, and the film spool is accessible for easy removal and replacement without any necessity of changing the position of the projector in order to remove a spool or reel and replace it with another.

What is claimed is:

1. A motion picture projector comprising a housing having a plurality of walls including a relatively narrow side wall, a relatively wide side wall, and an end wall, said projector being arranged for standing in either of two orientations wherein said wide side wall forms a top surface in a first orientation and said narrow side wall forms a top surface in a second orientation, control elements for said projector being mounted on said narrow side wall to face forward in said first orientation and upward in said second orientation, film spool means arranged on said wide side wall to rotate in a plane parallel with said wide side wall, a projection lens within said housing, said projection lens having an optical axis, a first mirror mounted for swinging movement between a first effective reflecting position intercepting a beam of light rays projected from said projection lens when said projector is in said first orientation and a second ineffective position out of said beam when said projector is in said second orientation, a first light aperture in said wide side wall of said housing in position to receive light reflected by said first mirror when in said first position with said projector in said first orientation, a second mirror mounted on said wide side wall adjacent said first light aperture in position to receive light reflected by said first mirror through said first aperture to said second mirror and to reflect such light in a direction approximately perpendicular to the direction of said optical axis of said projection lens and toward the plane of said narrow side wall on which said control elements are mounted, and a second light aperture in said end wall of said housing in alignment with said optical axis in position to have said beam of light from said projection lens pass along said optical axis and out of the housing through said second aperture when said first mirror is in its second ineffective position and said projector is in said second orientation.

2. A projector as defined in claim 1, wherein said second mirror is mounted for swinging movement about a pivotal axis approximately parallel to said narrow side wall on which said control elements are mounted and approximately at an edge of said first light aperture which is farthest away from said narrow side wall.

3. A projector as defined in claim 1, further comprising a closure flap movable from a position closing said second light aperture to an open position, and means coupling movement of said closure flap to said swinging movement of said first mirror.

4. A projector as defined in claim 1, wherein said second mirror is mounted for swinging movement from an ineffective position to an effective reflecting position, further comprising manually operable means for swinging both mirrors.

5. A projector as defined in claim 4, further comprising a closure flap movable between a closing position and an open position with respect to said second light aperture, and wherein said manually operable means includes a rotatable knob, cam means coupled thereto, and means for moving said closure flap and swinging said first mirror and said second mirror upon operation of said cam means.

6. A projector as defined in claim 5, wherein turning said knob in one direction from a predetermined intermediate position causes said closure flap to be moved to its open position and said first mirror to be swung to its said ineffective position, and turning said knob in the opposite direction from said intermediate position causes said second mirror to swing from its ineffective position to its effective reflecting position.

7. A projector as defined in claim 6, wherein the first part of turning said knob in said opposite direction moves said second mirror relatively rapidly from its ineffective position to its approximate effective reflecting position, and the last part of turning said knob in said opposite direction moves said second mirror relatively slowly to provide a fine adjustment of the exact reflecting position desired.

8. A projector as defined in claim 4, wherein said second mirror in its said ineffective position serves as a closure member for closing said first light aperture.

* * * * *

UNITED STATES PATENT AND TRADEMARK OFFICE
CERTIFICATE OF CORRECTION

PATENT NO. : 4,093,363
DATED : June 6, 1978
INVENTOR(S) : Claus Prochnow

It is certified that error appears in the above-identified patent and that said Letters Patent are hereby corrected as shown below:

In the heading of the patent, add the following:

-- [30] Foreign Application Priority Data

November 3, 1975   Germany............ 2549055 --

Signed and Sealed this

Twenty-first Day of November 1978

[SEAL]

Attest:

RUTH C. MASON
*Attesting Officer*

DONALD W. BANNER
*Commissioner of Patents and Trademarks*